US006337460B2

(12) United States Patent
Kelkar et al.

(10) Patent No.: US 6,337,460 B2
(45) Date of Patent: Jan. 8, 2002

(54) PLASMA ARC TORCH AND METHOD FOR CUTTING A WORKPIECE

(75) Inventors: Milind G. Kelkar, Claremont; Kevin D. Horner-Richardson, Cornish, both of NH (US); Jesse A. Roberts, Milton, VT (US); Geoffrey H. Putnam, Topsham, VT (US); David A. Small, Strafford, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 09/772,260

(22) Filed: Jan. 29, 2001

Related U.S. Application Data

(60) Provisional application No. 60/181,111, filed on Feb. 8, 2000.

(51) Int. Cl.[7] ................................................ B23K 10/00

(52) U.S. Cl. .............................. 219/121.5; 219/121.51; 219/121.59; 219/75

(58) Field of Search ....................... 219/121.48, 121.36, 219/121.5, 121.51, 121.59, 74, 75; 313/231.41, 231.51

(56) References Cited

U.S. PATENT DOCUMENTS

| | | | | |
|---|---|---|---|---|
| 4,625,094 A | | 11/1986 | Marhic et al. | |
| 4,743,734 A | | 5/1988 | Garlanov et al. | |
| 4,748,312 A | | 5/1988 | Hatch et al. | |
| 4,861,962 A | | 8/1989 | Sanders et al. | |
| 4,902,871 A | | 2/1990 | Sanders et al. | |
| 4,954,683 A | | 9/1990 | Hatch | |
| 4,967,055 A | | 10/1990 | Raney et al. | |
| 4,973,816 A | | 11/1990 | Haberman | |
| 5,013,885 A | | 5/1991 | Carkhuff et al. | |
| 5,017,752 A | | 5/1991 | Severance, Jr. et al. | |
| 5,023,425 A | | 6/1991 | Severance, Jr. | |
| 5,105,061 A | | 4/1992 | Blankenship | |
| 5,120,930 A | | 6/1992 | Sanders et al. | |
| 5,132,512 A | | 7/1992 | Sanders et al. | |
| 5,208,441 A | | 5/1993 | Broberg | |
| 5,216,221 A | * | 6/1993 | Carkhuff | 219/121.51 |
| 5,235,155 A | | 8/1993 | Yamada et al. | |
| 5,247,152 A | | 9/1993 | Blankenship | |
| 5,278,388 A | | 1/1994 | Huang | |
| 5,317,126 A | | 5/1994 | Couch, Jr. et al. | |
| 5,393,952 A | | 2/1995 | Yamaguchi et al. | |
| 5,396,043 A | | 3/1995 | Couch, Jr. et al. | |
| 5,591,357 A | | 1/1997 | Couch, Jr. et al. | |
| 5,681,489 A | | 10/1997 | Carkhuff | |
| 5,695,662 A | | 12/1997 | Couch, Jr. et al. | |
| 5,726,415 A | | 3/1998 | Luo et al. | |
| 5,900,168 A | * | 5/1999 | Saio et al. | 219/121.44 |

FOREIGN PATENT DOCUMENTS

| | | |
|---|---|---|
| FR | 2703557 A1 | 3/1993 |

* cited by examiner

*Primary Examiner*—Mark Paschall
(74) *Attorney, Agent, or Firm*—Senniger, Powers, Leavitt & Roedel

(57) ABSTRACT

A plasma arc torch and method for cutting a workpiece in which the torch has a primary gas flow path for receiving a primary working gas and directing it through the torch to a central exit opening of the torch for exhaustion from the torch onto the workpiece in the form of an ionized plasma. A secondary gas flow path in the torch receives a secondary gas separate from the primary working gas and directs it through the torch. The primary gas flow path is in fluid communication with the secondary gas flow path substantially upstream of the central exit opening of the torch to bleed primary working gas in the primary gas flow path into the secondary gas flow path for admixture therewith to form a secondary gas mixture to be exhausted from the torch.

28 Claims, 1 Drawing Sheet

PLASMA ARC TORCH AND METHOD FOR CUTTING A WORKPIECE

CROSS-REFERENCE TO RELATED APPLICATION

This application claims priority from provisional U.S. application Ser. No. 60/181,111 filed Feb. 8, 2000, which is incorporated herein by reference.

BACKGROUND OF THE INVENTION

The present invention relates generally to plasma arc torches and, in particular, to dual gas plasma arc torches that utilize both a primary working gas and a secondary gas.

Plasma torches, also known as electric arc torches, are commonly used for cutting and welding metal workpieces by directing a plasma consisting of ionized gas particles toward the workpiece. In a typical plasma torch, a gas to be ionized is supplied to a lower end of the torch and flows past an electrode before exiting through an orifice in the torch tip. The electrode, which is a consumable part, has a relatively negative potential and operates as a cathode. The torch tip (nozzle) surrounds the electrode at the lower end of the torch in spaced relationship with the electrode and constitutes a relatively positive potential anode. When a sufficiently high voltage is applied to the electrode, an arc is caused to jump the gap between the electrode and the torch tip, thereby heating the gas and causing it to ionize. The ionized gas in the gap is blown out of the torch and appears as an arc that extends externally off the tip. As the head or lower end of the torch is moved to a position close to the workpiece, the arc jumps or transfers from the torch tip to the workpiece because the impedance of the workpiece to ground is made lower than the impedance of the torch tip to ground. During this "transferred arc" operation, the workpiece itself serves as the anode. A shield cap is typically secured on the torch body over the torch tip and electrode to complete assembly of the torch.

One type of conventional plasma torch is a dual gas torch in which a secondary gas flows through the torch concurrently with the primary working gas for purposes of cooling various parts of the torch or for affecting the plasma arc or the quality of the cut made in the workpiece. For example, it is common to direct the secondary gas flow onto the plasma arc as the arc exits the central orifice of the tip. However, this can lead to plasma arc instabilities, especially at low amperages, such as less than or equal to about 15 amps. These instabilities can adversely effect both the bevel angle of the cut and the surface quality of the cut.

SUMMARY OF THE INVENTION

The quality, such as surface finish, bevel angle and dross, of the cut made by the dual gas torch has been found to be a strong function of the composition of the secondary gas. A novel dual gas plasma arc torch is provided having a tip with bleed holes in fluid communication with both the primary and secondary gas flow paths in the torch so that a substantial portion of the primary working gas (e.g., oxygen) is bled off into the flow path of the secondary gas to form an oxygen rich secondary gas mixture in the torch. The size and number of the bleed holes regulates the amount of primary working gas bled into the secondary gas flow path. It is known that the optimal secondary gas mixture composition is a function of the current level at which the torch operates. Thus, the secondary gas mixture may be optimized for a particular torch by simply interchanging the tip with another tip having the desired number and size of bleed holes.

The torch of the present invention also incorporates a novel tip and shield cap design in which the shield cap sealingly engages the torch, and more particularly the tip, to prevent secondary gas mixture formed in the torch from impinging or otherwise being directed onto the plasma arc as the plasma exits the central orifice of the tip. Instead, the secondary gas mixture is exhausted from the torch through openings in the shield cap spaced radially from the central orifice to flood the kerf region of the cut with the oxygen (or other primary gas) enriched secondary gas mixture.

In general, a plasma arc torch of the present invention comprises a primary gas flow path in the torch for receiving a primary working gas and directing it through the torch to a central exit opening of the torch for exhaustion from the torch onto a workpiece in the form of an ionized plasma. A secondary gas flow path in the torch receives a secondary gas separate from the primary working gas and directs it through the torch. The primary gas flow path is in fluid communication with the secondary gas flow path substantially upstream of the central exit opening of the torch to bleed primary working gas in the primary gas flow path into the secondary gas flow path for admixture therewith to form a secondary gas mixture to be exhausted from the torch.

A tip of the present invention for use in a plasma arc torch of the type having a primary gas flow path for directing a primary working gas through the torch and a secondary gas flow path for directing a secondary gas through the torch generally comprises an inner surface at least partially defining the primary gas flow path and an outer surface. At least one bleed hole extends from the inner surface to the outer surface for bleeding gas in the primary gas flow path into the secondary gas flow path for admixture with the secondary gas to form a secondary gas mixture. The at least one bleed hole is located in the tip such that admixture of the primary and secondary gases occurs generally within the torch.

A combination tip and shield cap of the present invention for use in a plasma arc torch of the type having a primary gas flow path for directing a primary working gas through the torch and a secondary gas flow path for directing a secondary gas through the torch generally comprises the tip having a central exit orifice through which primary gas from the primary gas flow path exits in the form of an ionized plasma. The shield cap substantially surrounds the tip and has a central opening in generally coaxial relationship with the central exit orifice of the tip. The shield cap further has at least one secondary opening in spaced relationship with the central opening of the shield cap and in fluid communication with the secondary gas flow path for exhausting secondary gas in the secondary gas flow path from the torch. At least one of the tip and shield cap are configured for sealing the secondary gas flow path against fluid communication with the primary gas flow path intermediate the secondary opening and the central opening of the shield cap to prevent secondary gas in the secondary gas flow path from impinging on the primary gas as the primary gas exits the torch.

In another embodiment, a gas mixture system of the present invention for a plasma torch of the type having a primary gas flow path for directing a primary working gas through the torch and a secondary gas flow path for directing a secondary gas through the torch generally comprises a plurality of tips each adapted for use in the plasma torch. Each tip comprises an inner surface at least partially defining the primary gas flow path and an outer surface. At least one bleed hole extends from the inner surface to the outer surface of each tip for bleeding gas in the primary gas flow path into the secondary gas flow path for admixture with the secondary gas to form a secondary gas mixture. The at least one bleed hole is located in the tip such that admixture of the primary and secondary gases occurs generally within the torch. The at least one bleed hole of each tip is sized such that the amount of primary gas bled from the primary gas flow path through the at least one bleed hole of each tip is different for each tip and corresponds to a current level.

A shield cap of the present invention for use with a plasma torch of the type having a primary gas flow path for directing a primary working gas through the torch and a secondary gas flow path for directing a secondary gas through the torch comprises a hollow body having a central longitudinal axis. An upper end of the shield cap is adapted for connection to the torch, and a lower end has a central opening on said central longitudinal axis. At least one secondary opening is spaced radially outward from the central opening and is in fluid communication with the secondary gas flow path for exhausting gas in the secondary gas flow path from the torch. The shield cap has an annular sealing surface for sealing engagement with the torch to seal the secondary gas flow path against fluid communication with the primary gas flow path downstream of the fluid communication of the secondary opening with the secondary gas flow path to prevent gas in the secondary gas flow path from impinging on the primary gas as the primary gas exits the torch.

Finally, a method of present invention of operating a torch of the type having a primary gas flow path for directing a primary working gas through the torch and a secondary gas flow path for directing a secondary gas through the torch to cut a workpiece comprises directing primary gas to flow through the primary gas flow path to a central exit opening of the torch for exhaustion from the torch onto the workpiece in the form of an ionized plasma. Secondary gas is directed to flow through the secondary gas flow path of the torch. Primary working gas in the primary gas flow path is bled into the secondary gas flow path substantially upstream of the central exit opening of the torch for admixture with the secondary gas to form a secondary gas mixture to be exhausted from the torch generally toward the workpiece.

Among the several objects and features of the present invention is the provision of a plasma torch and method which increases the stability of the plasma arc; the provision of such a torch and method which improves the surface quality, dross and bevel angle of the cut made by the torch; the provision of such a torch and method which floods the kerf region of the cut with an oxygen enriched secondary gas mixture; the provision of such a torch and method which prevents secondary gas in the torch from impinging on the plasma arc as plasma exits the torch; and the provision of such a torch and method in which the secondary gas mixture is optimized for the current level at which the torch operates.

Other objects and features will be in part apparent and in part pointed out hereinafter.

DETAILED DESCRIPTION OF THE PREFERRED EMBODIMENTS

Figure 1:
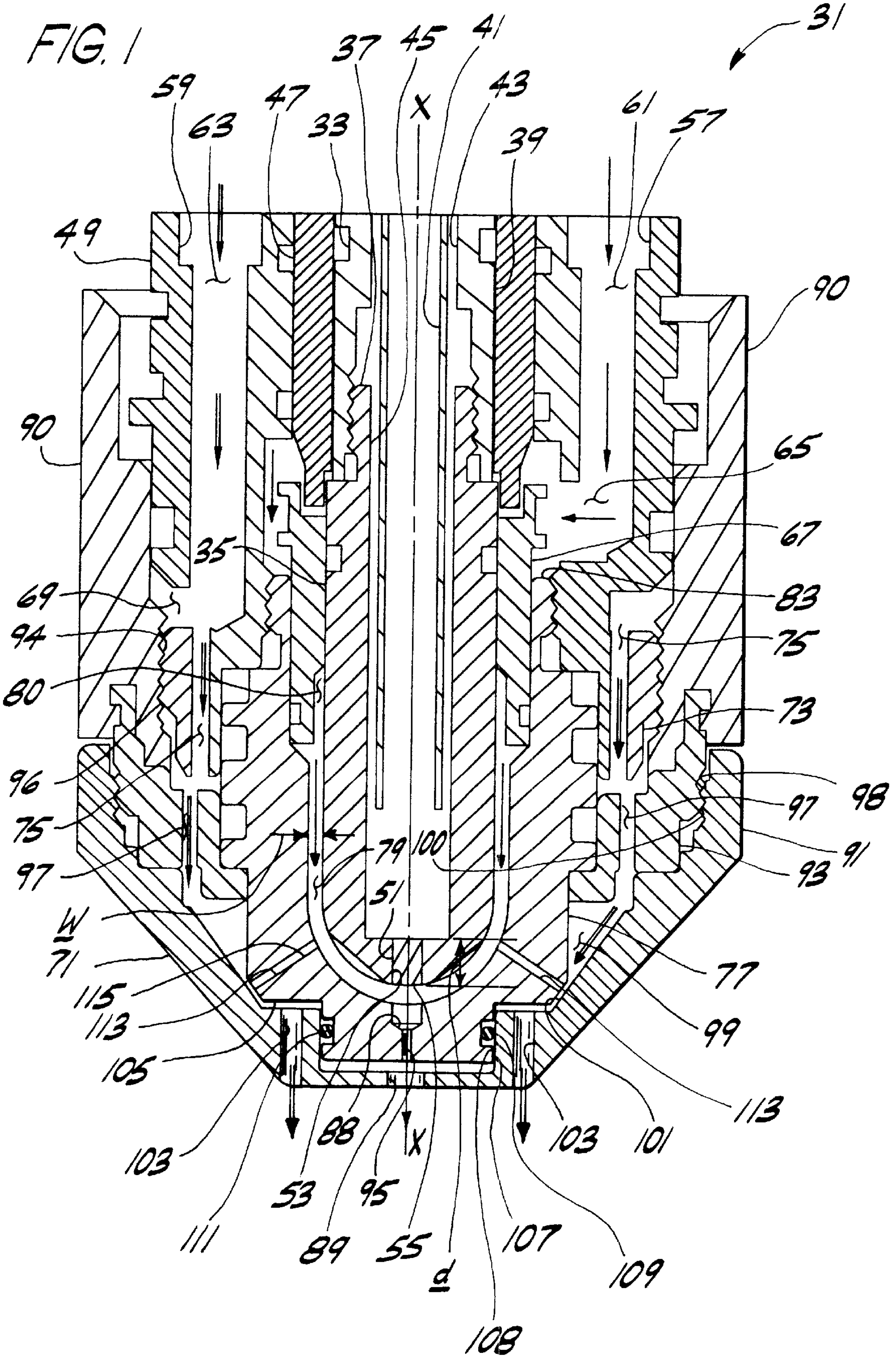
FIG. 1 is a partial vertical section of a torch head of a plasma torch of the present invention.

With reference to FIG. 1, a torch head of a plasma torch of the present invention is generally indicated at 31. The plasma torch is of the dual gas type in which both a primary working gas and a secondary gas or fluid are utilized. The torch head 31 includes a cathode 33 having an upper end (not shown) secured in a torch body (not shown) of the torch, and an electrode 35 having an upper end 37 electrically connected to a lower end 39 of the cathode. The cathode 33 and electrode 35 are arranged in coaxial relationship with each other about a longitudinal axis X of the torch. The electrode 33 of the illustrated embodiment is constructed of copper, with an insert 51 of emissive material (e.g., hafnium) secured in a recess 53 in the bottom of the electrode to define a bottom face 55 of the insert. A central insulator 47 (a lower portion of which is shown in the drawing) constructed of a suitable electrically insulating material surrounds a substantial portion of the cathode 33 to electrically isolate the cathode from a generally tubular anode 49 that surrounds the insulator. A cooling tube 41 extends longitudinally within a central bore 43 of the cathode 33 down into a central bore 45 of the electrode 35. The cooling tube 41 is in fluid communication with a source (not shown) of cooling water to receive cooling water into the tube and direct the water down into the electrode bore 45. The cooling water flows out from the cooling tube 41 generally at the bottom of the tube to cool the electrode 35, particularly in the area of the emissive insert 51. The water then flows upward within the electrode bore 45 and cathode bore 43 and outward therefrom for use in cooling other components of the torch prior to being exhausted from the torch head 31.

The anode has a pair of intake ports 57, 59 for separately receiving a primary working gas and a secondary gas. More particularly, the primary gas intake port 57 is in fluid communication with a source (not shown) of working gas for receiving the primary working gas, and the secondary gas intake port is in fluid communication with a source (not shown) of secondary gas for receiving secondary gas. In the preferred embodiment, the primary gas is pure oxygen and the secondary gas is compressed air, free of oil impurities. However, it is understood that the primary gas may be other than oxygen, such as air, nitrogen, argon or an argon/hydrogen mixture, and that the secondary gas may be other than air, such as oxygen, nitrogen, argon, carbon dioxide or reducing gases, without departing from the scope of this invention. Primary and secondary passages, indicated as 61 and 63, respectively, extend down through the anode 49 from the corresponding intake ports 57, 59 to direct the primary and secondary gases down through the anode. The first passage 61 leads to an annular inner plenum 65 formed between the anode 49 and the outer surfaces of the central insulator 47 and a gas distributor 67. The second passage 63 leads to an annular outer plenum 69 which is separate from the inner plenum 65 and defined by the anode 49 and the inner surface of a shield cap body 90 of a shield cap assembly 71 of the torch. A lower end 73 of the anode 49 includes longitudinally extending bores 75 in fluid communication with the outer plenum 69 to direct the secondary gas out from the lower end of the anode.

A metal tip 77, also commonly referred to as a nozzle, is disposed in the torch head 31 surrounding a lower portion of the electrode 35 in radially and longitudinally spaced relationship therewith to form a gas passage 79 (otherwise referred to as an arc chamber or plasma chamber) between the tip and the electrode. An inlet passage 80 is defined by the electrode and a lower portion of the generally tubular gas distributor 67 extending longitudinally between the tip 77 and the central insulator 47 in radially spaced relationship with the electrode. The inlet passage 80 is in fluid communication with the gas passage 79 for directing primary gas into the gas passage. In the preferred embodiment, the gas passage 79 has a width w of approximately 0.041 inches. However, the width w may vary without departing from the scope of this invention. An upper end 83 of the tip 77 extends up between the anode 49 and the gas distributor 67 in close contact relationship with the gas distributor. Axially extending grooves (not shown) in the outer surface of the gas distributor are in fluid communication with the inner plenum 65 of the anode 49 for directing primary gas down along the outer surface of the gas distributor between the gas distributor and the upper end 83 of the tip 77. Openings (not shown) in the gas distributor 67 are in fluid communication with the grooves in the outer surface of the gas distributor and the inlet passage 80 between the gas distributor and electrode 35 to direct primary gas in the inner plenum 65 of the anode 49 to flow into the inlet passage and then down through the gas passage 79. The openings in the gas distributor are preferably formed generally tangentially thereto for causing a swirling action of the primary gas flowing into and down through the gas passage. A portion of the gas passage 79 generally along the bottom face 55 of the insert 51 defines an arc region in which a plasma arc is attached to the electrode. A central exit orifice 89 of the tip 77 is in fluid communication with the gas passage 79 such that primary gas exits the torch in the form of a plasma arc and is directed down against the workpiece. An upper end 88 of the tip orifice 89 is preferably widened to approximately the width of the insert 51 to inhibit gouging of the tip as the arc flows through the tip orifice.

The shield cap assembly 71 secures the tip 77, electrode 35 and gas distributor 67 in axially fixed position during operation of the torch. In the illustrated embodiment, the shield cap assembly 71 comprises a shield cap body 90 of heat insulating material, an insert 93 of similar heat insulating material secured to the shield cap body and a shield cap 91. The shield cap body 90 surrounds the anode 49 and has internal threads 94 for threadable engagement with corresponding external threads 96 on the anode. The shield cap 91 has internal threads 98 for threadable engagement with corresponding external threads 100 on the shield cap insert 93. A central opening 95 in the shield cap 91 is coaxially aligned with the central exit orifice 89 of the tip 77 to define a central exit opening of the torch through which plasma exiting the. tip is directed onto the workpiece. Longitudinally extending bores 97 in the shield 5 cap insert 93 are in fluid communication with the bores 75 in the lower end 73 of the anode 49 so that secondary gas flowing through the anode is further directed down through the bores in the shield cap insert into a secondary gas chamber 99 formed between the shield cap 91, the shield cap insert and the tip 77.

The secondary gas chamber 99 of the illustrated embodiment includes a narrow passage 101 extending generally downward between the shield cap 91 and the tip 77 to secondary exit openings 103 in the shield cap for exhausting gas in the secondary gas chamber from the torch. In the preferred embodiment, the secondary openings 103 are in generally radially spaced relationship with the central opening 95 of the shield cap 91 to direct gas exhausted from the torch through the secondary openings onto the kerf region of the cut made by the plasma arc in the workpiece. As an example, the shield cap 91 of the illustrated embodiment has twelve secondary openings 103 spaced at intervals around the central opening 95. While the secondary holes 103 shown in the drawing extend axially, it is contemplated that the secondary holes may be angled, such as being directed inward toward or outward away from the central opening 95 of the shield cap 91.

The diameter of the tip 77 substantially decreases at its lower end to form an annular shoulder 105 and a generally cylindrical seat 107 for seating the shield cap 91 of the shield cap assembly 71 on the lower end of the tip. In the preferred embodiment, the diameter of the seat 107 is sized such that the outer wall of the seat is positioned at a location intermediate the secondary openings 103 and the central opening 95 of the shield cap 91. An O-ring 109, broadly referred to as a sealing member, seats in an annular groove 111 in the outer wall of the seat 107 of the tip 77 and is sized in cross-section to protrude generally radially outward from the seat 107 of the tip for sealing engagement with a sealing surface 108 of the shield cap 91 when the cap is placed over the tip, thus sealing the torch against gas in the secondary gas chamber 99 from flowing to the plasma arc as plasma exits the tip orifice 89. Substantially all of the gas in the secondary gas chamber 99 is thus exhausted from the torch through the secondary openings 103 in the shield cap 91.

It is understood that the groove 111 in the seat 107 of tip 77 may be omitted and the O-ring 109 may instead seat in a circular groove (not shown) in the shield cap 91 to define the sealing surface 108 of the shield cap for sealing engagement with the seat of the tip and remain within the scope of this invention. Also, while the seat 107 shown in the drawing at the lower end of the tip 77 extends axially to form a right angle with the annular shoulder 105, it is understood that the shoulder may be omitted and the seat may be tapered inward (e.g., frusto-conical) or flat, as long as the O-ring 109 is disposed at a location intermediate the central opening 95 and secondary openings 103 of the shield cap 91 to seal gas in the secondary gas chamber 99 against flowing to the plasma arc as plasma exits the tip orifice 89. Finally, it is understood that the O-ring 109 may be positioned between the tip 77 and part of the torch other than the shield cap 91, or between the shield cap and part of the torch other than the tip, as long as the secondary gas flow path is sealed against gas in the secondary gas chamber 99 from flowing to the plasma arc as plasma exits the tip orifice 89.

Bleed holes 113 (two are shown in the drawing) are formed in the tip 77 in fluid communication with both the gas passage 79 and the secondary gas chamber 99 to bleed primary working gas in the gas passage into the secondary gas chamber for admixture with the secondary gas in the chamber to form a secondary gas mixture to be exhausted from the torch through the secondary openings 103 in the shield cap 91. As shown in the drawing, the bleed holes 113 are located in the tip 77 with inner (upper) ends 115 of the bleed holes being in fluid communication with the gas passage 79 and spaced a distance d above the bottom of the electrode 35. In the preferred embodiment, the distance d of the inner ends 115 of the bleed holes 113 above the bottom of the electrode 35 is sufficient to bleed a portion of the primary working gas from the gas passage before the gas flows down to the arc region extending generally along the bottom face 55 of the insert 51. As an example, the distance d of the illustrated embodiment is approximately 0.109 inches. However the distance d may vary without departing from the scope of this invention. Also, while the bleed holes 113 shown in the drawing are angled downward away from the gas passage 79, it is understood that the bleed hole may be at any angle, such as a zero degree angle (e.g., extending radially from the gas passage) or extending upward away from the gas passage, and remain within the scope of this invention.

In the preferred embodiment, where the current level is relatively low, such as about 15 amperes, six bleed holes 113 are provided and are sized so that the portion of primary gas bled off from the gas passage 79 for admixture with the secondary gas is substantially greater than the portion of primary gas flowing to the tip orifice 89. For example, the primary gas flow rate may be approximately 85 cfh, with 66 cfh being bled from the gas passage 79 into the secondary gas chamber 99. The remaining primary gas exits through the central orifice 89 of the tip 77. Thus, in this example, roughly 78% of the primary gas flowing through the gas passage 79 is bled out from the gas passage and into the secondary gas chamber 99. However, it is understood that the portion of the primary gas bled from the gas passage 79 may vary, such as by changing the number and size of the bleed holes 113 or the pressure of the primary gas, without departing from the scope of this invention. In particular, the optimal secondary gas mixture will vary for different current levels at which the torch operates.

In operation, primary working gas, such as pure oxygen, is pumped from the source of working gas into the torch and flows through a primary gas flow path (indicated by single shaft arrows in the drawing) comprising the anode primary intake port 57, anode passage 61, inner plenum 65, the grooves in the outer surface of the gas distributor 67, gas distributor openings, inlet passage 80, gas passage 79, tip orifice 89, and the central opening 95 of the shield cap 91. Secondary gas, such as compressed air, is received from the source of secondary gas into the torch and flows through a secondary gas flow path (indicated by double shaft arrows in the drawing) comprising the secondary gas intake port 59, anode passage 63, outer plenum 69, the longitudinally extending bores 75 in the lower end 73 of the anode, the bores 97 in the shield cap insert 93, the secondary gas chamber 99 and secondary openings 103 in the shield cap 91.

As primary gas flows down through the gas passage 79 to the arc region, a substantial portion (e.g., 78%) of the primary gas bleeds out from the gas passage through the bleed holes 113 in the tip 77 and is directed into the secondary gas chamber 99 for admixture with the secondary gas in the secondary gas chamber to form a secondary gas mixture. As will be seen, in the preferred embodiment where the primary gas is pure oxygen, the amount of oxygen in the secondary gas mixture is substantially increased by bleeding primary gas into the secondary gas chamber for admixture with the secondary gas. Primary gas remaining in the gas passage flows down through the arc region and out through the exit orifice 89 of the tip 77 and the central opening 95 of the shield cap 91 onto the workpiece in the form of an ionized plasma. The secondary gas mixture formed in the secondary gas chamber 99 concurrently flows down between the tip 77 and the shield cap 91 to the secondary openings 103 in the shield cap. Because the secondary gas mixture is sealed by the O-ring 109 against flowing to the plasma arc exiting the tip orifice 89, substantially all of the secondary gas mixture is exhausted from the torch through the secondary openings 103 in the shield cap 91, thereby directing a primary gas (e.g., oxygen) enriched gas mixture onto the workpiece, with the enriched gas mixture generally surrounding the plasma arc and being directed at the kerf region of the cut.

While the plasma torch of the present invention is shown and described herein as including a shield cap 91 that extends down beyond the lower end of the tip 77 so that the central opening 95 of the shield cap defines the central exit opening of the torch, it is understood that the tip may instead extend down through the central opening of the shield cap such that the tip orifice 89 defines the central exit opening of the torch without departing from the scope of this invention. In such an embodiment, the primary gas flow path of the torch would not include the central opening 95 of the shield cap 91.

In view of the above, it will be seen that the several objects of the invention are achieved and other advantageous results attained. Sealing off the flow of the secondary gas mixture against impinging on the plasma arc as plasma exits the tip 77 improves plasma arc stability and also improves the surface finish, dross characteristics and bevel angle of the cut. Bleeding oxygen from the gas passage 77 into the secondary gas chamber 99 to form an oxygen rich secondary gas mixture allows the kerf region of the cut to be flooded with the oxygen rich mixture as the mixture is exhausted from torch through the secondary openings 103 in the shield cap 91. An oxygen rich secondary gas mixture has been found to positively impact the quality (e.g., surface finish, bevel angle and dross) of the cut made by the torch. A set of tips having various numbers and/or sizes or bleed holes may be provided as a gas mixture system for adjusting the amount of primary gas bled into the secondary gas to form the secondary gas mixture. This allows for optimizing the secondary gas mixture in accordance with the current level at which the torch operates.

As various changes could be made in the above constructions without departing from the scope of the invention, it is intended that all matter contained in the above description or shown in the accompanying drawings shall be interpreted as illustrative and not in a limiting sense.

What is claimed is:

1. A plasma torch comprising:

a primary gas flow path in the torch for receiving a primary working gas and directing it through the torch to a central exit opening of the torch for exhaustion from the torch onto a workpiece in the form of an ionized plasma;

a secondary gas flow path in the torch separate from the primary gas flow path for receiving a secondary gas and directing it through the torch, the primary gas flow path being in fluid communication with the secondary gas flow path substantially upstream of the central exit opening of the torch to bleed primary working gas in the primary gas flow path into the secondary gas flow path for admixture therewith to form a secondary gas mixture to be exhausted from the torch.

2. A plasma torch as set forth in claim 1 further comprising a secondary exit opening in the torch separate from the central exit opening and in spaced relationship therewith for exhausting the secondary gas mixture from the torch.

3. A plasma torch as set forth in claim 2 wherein the secondary gas flow path is sealed from the primary gas flow path generally downstream of said fluid communication between the primary gas flow path and the secondary gas flow path to prevent secondary gas mixture in the secondary gas flow path from impinging on the primary working gas as the primary working gas exits the central exit opening of the torch.

4. A plasma torch as set forth in claim 3 further comprising:

a cathode;

an electrode electrically connected to the cathode;

a tip surrounding the electrode in spaced relationship therewith to define a primary gas passage forming at least part of the primary gas flow path, the tip having a central exit orifice in fluid communication with the gas passage;

a shield cap surrounding the tip and having a central opening in fluid communication with the central exit orifice of the tip to define the central exit opening of the torch through which primary gas is directed onto the workpiece in the form of an ionized plasma, the shield cap further having at least one secondary opening in spaced relationship with the central opening of the shield cap to define the secondary opening of the torch for exhausting the secondary gas mixture from the torch;

the tip having at least one bleed hole in fluid communication with the primary gas passage upstream of the central exit orifice of the tip, the bleed hole also being in fluid communication with the secondary gas flow path to bleed a portion of the primary gas in the primary gas passage into the secondary gas flow path for admixture with the secondary gas in the torch to form the secondary gas mixture whereby the secondary gas mixture is exhausted from the torch through the at least one secondary opening in the shield cap.

5. A plasma torch as set forth in claim 4 further comprising a sealing member for sealingly engaging the tip and shield cap intermediate the central opening of the shield cap and the at least one secondary opening of the shield cap to seal the secondary gas flow path from the primary gas flow path for preventing the secondary gas mixture in the secondary gas flow path from impinging on the primary gas as the primary gas exits the central exit orifice of the tip and the central opening of the shield cap.

6. A plasma torch as set forth in claim 1 wherein the primary gas is oxygen.

7. A plasma torch as set forth in claim 6 wherein the secondary gas is air.

8. A plasma torch as set forth in claim 1 wherein the fluid communication of the primary gas flow path with the secondary gas flow path allows an amount of primary working gas in the primary gas flow path to bleed into the secondary gas flow path in accordance with a current level at which the torch operates.

9. A plasma torch as set forth in claim 8 wherein the torch is operable at a current level of approximately 15 amperes, the fluid communication of the primary gas flow path with the secondary gas flow path allowing approximately 78 percent of the primary working gas in the primary gas flow path to bleed into the secondary gas flow path for admixture with the secondary gas in the secondary gas flow path.

10. A tip for use in a plasma arc torch of the type having a primary gas flow path for directing a primary working gas through the torch and a secondary gas flow path for directing a secondary gas through the torch, the tip having an inner surface at least partially defining the primary gas flow path and an outer surface, the tip further having at least one bleed hole extending from the inner surface to the outer surface for bleeding gas in the primary gas flow path into the secondary gas flow path for admixture with the secondary gas to form a secondary gas mixture, the at least one bleed hole being located in the tip such that admixture of the primary and secondary gases occurs generally within the torch.

11. A tip as set forth in claim 10 wherein the outer surface of the tip at least partially defines the secondary gas flow path of the torch.

12. A tip as set forth in claim 10 wherein the at least one bleed hole angles generally downward and outward from the inner surface of the tip to the outer surface of the tip.

13. A combination tip and shield cap for use in a plasma arc torch of the type having a primary gas flow path for directing a primary working gas through the torch and a secondary gas flow path for directing a secondary gas through the torch, the tip having a central exit orifice through which primary gas from the primary gas flow path exits in the form of an ionized plasma, the shield cap substantially surrounding the tip and having a central opening in generally coaxial relationship with the central exit orifice of the tip, said shield cap further having at least one secondary opening in spaced relationship with the central opening of the shield cap and in fluid communication with the secondary gas flow path for exhausting secondary gas in the secondary gas flow path from the torch, at least one of the tip and shield cap being configured for sealing the secondary gas flow path against fluid communication with the primary gas flow path intermediate the secondary opening and the central opening of the shield cap to prevent secondary gas in the secondary gas flow path from impinging on the primary gas as the primary gas exits the torch.

14. A combination tip and shield cap as set forth in claim 13 wherein the tip and shield cap have opposing surfaces in closely spaced relationship with each other when the shield cap surrounds the tip, at least one of the opposing surfaces of the tip and shield cap having a groove therein for seating a sealing member, the sealing member being sized for protruding outward from the at least one opposing surface for sealing engagement with the other of said opposing tip and shield cap surfaces.

15. A combination tip and shield cap as set forth in claim 14 wherein the opposing tip and shield cap surfaces are generally cylindric and are concentric with the central exit orifice of the tip.

16. A combination tip and shield cap as set forth in claim 14 wherein said groove is formed in the tip surface, the groove being sized for seating an O-ring defining the sealing member for sealing engagement with the opposing shield cap surface.

17. A combination tip and shield cap as set forth in claim 13 wherein the central opening of the shield cap defines a central exit opening of the torch through which primary working gas exits the torch in the form of an ionized plasma.

18. A gas mixture system for a plasma torch, the torch being of the type having a primary gas flow path for directing a primary working gas through the torch and a secondary gas flow path for directing a secondary gas through the torch, the system comprising a plurality of tips each adapted for use in the plasma torch, each tip having an inner surface at least partially defining the primary gas flow path and an outer surface, each tip further having at least one bleed hole extending from the inner surface to the outer surface for bleeding gas in the primary gas flow path into the secondary gas flow path for admixture with the secondary gas to form a secondary gas mixture, the at least one bleed hole being located in the tip such that admixture of the primary and secondary gases occurs generally within the torch, the at least one bleed hole of each tip being sized such that the amount of primary gas bled from the primary gas flow path through the at least one bleed hole of each tip is different for each tip and corresponds to a current level at which the torch operates.

19. A gas mixture system as set forth in claim 18 wherein the outer surface of each tip at least partially defines the secondary gas flow path.

20. A gas mixture system as set forth in claim 18 wherein the size of the at least one bleed hole of each tip is sized as a function of the current level at which the torch operates.

21. A gas mixture system as set forth in claim 18 wherein the number of bleed holes in each tip is a function of the current level at which the torch operates.

22. A shield cap for use with a plasma torch of the type having a primary gas flow path for directing a primary working gas through the torch and a secondary gas flow path for directing a secondary gas through the torch, the shield cap comprising a hollow body having a central longitudinal axis, an upper end adapted for connection to the torch, a lower end having a central opening on said central longitudinal axis, at least one secondary opening spaced radially outward from the central opening and in fluid communication with the secondary gas flow path for exhausting gas in the secondary gas flow path from the torch, and an annular sealing surface on the shield cap for sealing engagement with the torch to seal the secondary gas flow path against fluid communication with the primary gas flow path downstream of the fluid communication of the secondary opening with the secondary gas flow path to prevent gas in the secondary gas flow path from impinging on the primary gas as the primary gas exits the torch.

23. A shield cap as set forth in claim 22 wherein said sealing surface is engageable by an O-ring seal disposed on the torch.

24. A shield cap as set forth in claim 23 wherein said sealing surface comprises a generally cylindric surface engageable by said O-ring seal disposed on the torch.

25. A shield cap as set forth in claim 22 wherein said sealing surface comprises a generally cylindric surface, said cylindric surface having a circular groove therein receiving an O-ring seal for sealingly engaging the torch.

26. A method of operating a torch of the type having a primary gas flow path for directing a primary working gas through the torch and a secondary gas flow path for directing a secondary gas through the torch for cutting a workpiece, the method comprising the steps of:

directing primary gas to flow through the primary gas flow path to a central exit opening of the torch for exhaustion from the torch onto the workpiece in the form of an ionized plasma;

directing secondary gas to flow through the secondary gas flow path of the torch;

bleeding primary working gas in the primary gas flow path into the secondary gas flow path substantially upstream of the central exit opening of the torch for admixture with the secondary gas to form a secondary gas mixture to be exhausted from the torch generally toward the workpiece.

27. The method of claim 26 further comprising the step of sealing the secondary gas flow path from the primary gas flow path generally downstream of the bleeding of primary working gas into the secondary gas flow path to prevent secondary gas mixture in the secondary gas flow path from impinging on the primary working gas as the primary working gas exits the central exit opening of the torch in the form of an ionized plasma.

28. The method as set forth in claim 26 further comprising the step of adjusting the amount of primary working gas in the primary gas flow path bled into the secondary gas flow path in accordance with a current level at which the torch operates.

* * * * *